(12) United States Patent
Khaykin et al.

(10) Patent No.: US 8,998,297 B1
(45) Date of Patent: Apr. 7, 2015

(54) SYSTEMS FOR MOUNTING A VEHICLE WINDSHIELD

(71) Applicant: Google Inc., Mountain View, CA (US)

(72) Inventors: Alex Khaykin, San Francisco, CA (US); Thomas Daniel, San Francisco, CA (US); Daniel Lynn Larner, San Jose, CA (US); Felix Jose Alvarez Rivera, San Jose, CA (US); Robert Kim, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/191,374

(22) Filed: Feb. 26, 2014

(51) Int. Cl.
*B60N 99/00* (2006.01)
*B60J 1/00* (2006.01)

(52) U.S. Cl.
CPC ........................................ *B60J 1/004* (2013.01)

(58) Field of Classification Search
USPC .......................... 296/187.03, 192, 96.21, 201
See application file for complete search history.

(56) References Cited

U.S. PATENT DOCUMENTS

| | | | |
|---|---|---|---|
| 5,027,569 A * | 7/1991 | Keys ................................ | 52/208 |
| 5,601,328 A * | 2/1997 | Bruhnke et al. ........... | 296/96.21 |
| 6,193,304 B1 | 2/2001 | Takahashi et al. | |
| 6,606,778 B1 * | 8/2003 | Krass et al. ...................... | 29/468 |
| 6,826,876 B2 * | 12/2004 | Brandner .................. | 52/204.597 |
| 7,604,280 B2 * | 10/2009 | Katcherian ................. | 296/96.21 |
| 2001/0030449 A1 * | 10/2001 | De Paoli ........................ | 296/201 |
| 2003/0006623 A1 * | 1/2003 | Cornils et al. .................. | 296/93 |
| 2006/0232093 A1 * | 10/2006 | Boehm et al. ............... | 296/96.21 |
| 2013/0300154 A1 * | 11/2013 | Schaefer ....................... | 296/192 |

FOREIGN PATENT DOCUMENTS

| | | |
|---|---|---|
| EP | 0 597 624 B1 | 10/2001 |
| EP | 1 810 892 A1 | 7/2007 |
| WO | 2008/109811 A2 | 9/2008 |
| WO | 2010/107766 A1 | 9/2010 |
| WO | 2013/082711 A1 | 6/2013 |
| WO | 2013/117552 A1 | 8/2013 |

* cited by examiner

*Primary Examiner* — Lori L Lyjak
(74) *Attorney, Agent, or Firm* — McDonnell Boehnen Hulbert & Berghoff LLP

(57) ABSTRACT

Systems for mounting a windshield to a vehicle are described. In one example, an apparatus configured to a mount a windshield to a vehicle is disclosed. The apparatus includes a foam configured to be positioned between the windshield and a frame of the vehicle along at least three sides of an interior perimeter of the windshield. The apparatus also includes one or more rigid components configured to compress the foam when the windshield is deformed. The one or more rigid components may be positioned at least partially within the foam. The apparatus further includes an attachment component configured to attach the foam to the frame of the vehicle.

20 Claims, 12 Drawing Sheets

SYSTEMS FOR MOUNTING A VEHICLE WINDSHIELD

BACKGROUND

Motorized vehicles have been used for over 100 years to transport people and products from one location to another location. Various autonomous systems and protective features have been developed and installed in vehicles as safety features. One example of an autonomous system is an automatic braking system that functions to apply the brakes and slow the vehicle without any driver input when an object near the vehicle is detected. Another example of an autonomous system is an emergency brake assist system that functions to increase braking pressure when an emergency stop is detected.

Vehicle bumpers and airbags are two examples of protective features. Vehicle bumpers may be installed on the front and rear of a vehicle. Such vehicle bumpers are generally designed to absorb energy. Airbags may be designed to deploy when the vehicle detects a contact with an object in order to prevent injury to occupants of a vehicle. Some vehicles include external airbags that are affixed to a vehicle's cowl and configured to cover the surface of a windshield with a compliant material when the vehicle detects a contact with an object. The external airbags may help mitigate an impact of the object with the vehicle's windshield, for example.

SUMMARY

The present application describes embodiments that relate to systems for mounting a vehicle windshield. As described herein, a windshield may be mounted to a vehicle in unique ways which allow for energy of an impact with the windshield to be dissipated. In one example, the windshield may be mounted to the vehicle using an apparatus that includes a foam and one or more rigid components configured to compress the foam when the windshield is deformed. For instance, the foam may be positioned along at least three sides of an interior perimeter of the windshield, and two rigid components may be attached to a first side and a second side of the windshield respectively. In another example, the windshield may include multiple slots near a periphery of the windshield, and one or more rigid components configured to be inserted within the slots. One or more edges of the windshield may then be encased in a casing that is filled with foam. If an object contacts the windshield and deforms the windshield inward (i.e. toward the interior of the vehicle), the deformation may cause a displacement of the windshield which is guided by the slots built into the outside edge(s) of the windshield. Advantageously, in both examples, a portion of the impact energy resulting from the contact may be dissipated as the foam is compressed, alleviating the severity of the impact with the windshield.

In one example aspect, a vehicle is disclosed. The vehicle may include a frame, a windshield, and an apparatus configured to mount the windshield to the frame. The apparatus may include a foam configured to be positioned between the windshield and the frame along at least a portion of an interior perimeter of the windshield. The apparatus may further include one or more rigid components configured to compress the foam when the windshield is deformed. The one or more rigid components may be positioned at least partially within the foam.

In another example aspect, an apparatus configured to mount a windshield to a vehicle is disclosed. The apparatus may include a foam, one or more rigid components, and an attachment component. The foam may be configured to be positioned between the windshield and a frame of the vehicle along a portion of at least three sides of an interior perimeter of the windshield. The one or more rigid components may be configured to compress the foam when the windshield is deformed, and may be positioned at least partially within the foam. And the attachment component may be configured to attach the foam to the frame of the vehicle.

In still another example aspect, an apparatus configured to mount a windshield to a vehicle is disclosed. The apparatus may include a flexible bladder, one or more rigid components, and a body plate. The flexible bladder may be configured to encase an energy-absorbing material, and configured to be positioned between the windshield and a frame of the vehicle along a portion of an interior perimeter of the windshield. The one or more rigid components may be configured to attach to the interior perimeter of the windshield and compress the flexible bladder when the windshield is deformed. And the body plate may be configured to attach the flexible bladder to the frame of the vehicle.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
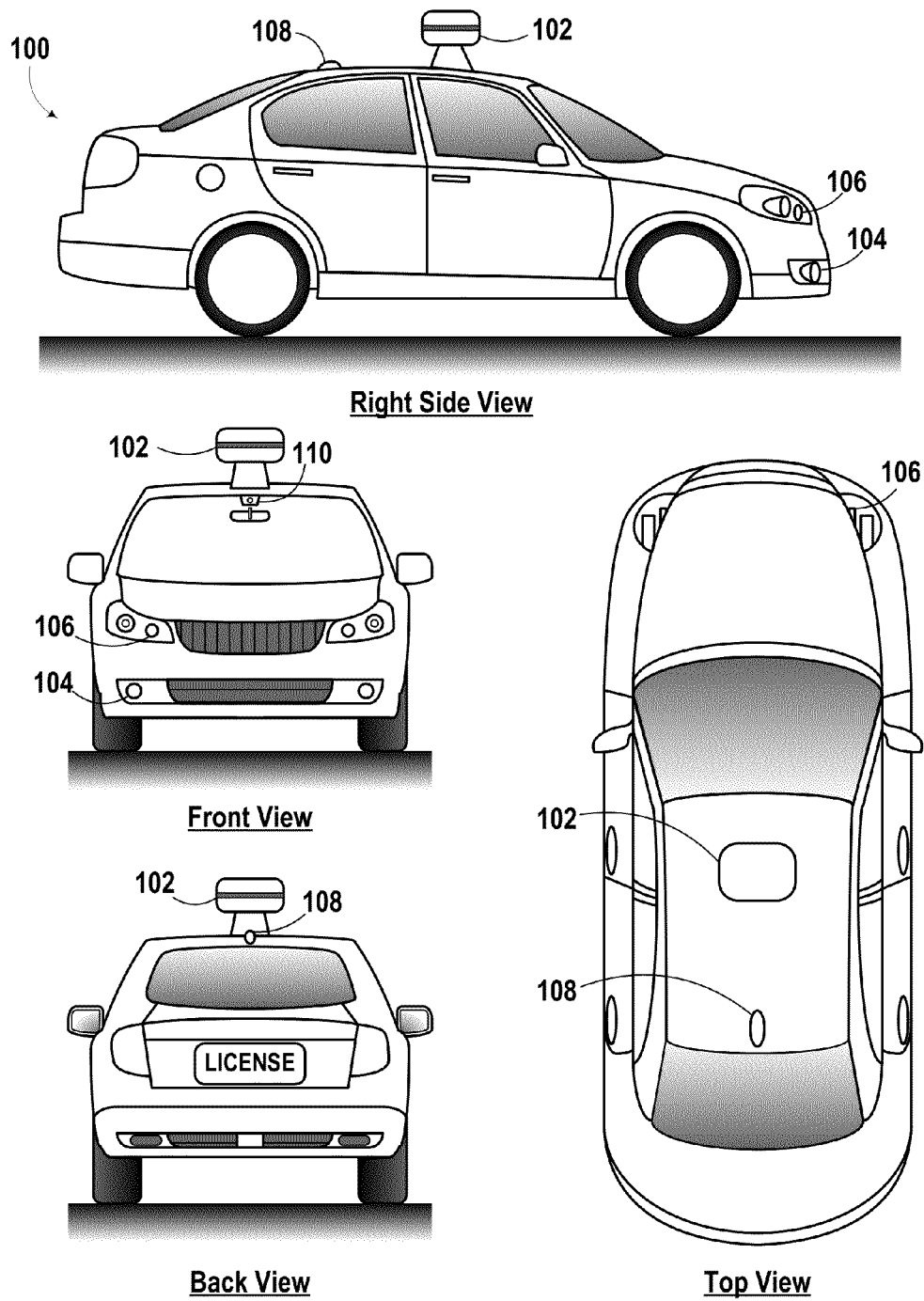
FIG. 1 illustrates an example vehicle, in accordance with an embodiment.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure as generally describe herein, and illustrated in the figures, can be arranged, substituted, combined, separated, and designed in a wide variety of different configurations, all of which are explicitly contemplated herein.

There are continued efforts to improve vehicle safety, including the development of autonomous vehicles equipped with accident-avoidance systems that may have the ability to avoid all accidents. However, while such systems are being developed, it is desirable to provide safety mechanisms that reduce or prevent injury when a contact with a vehicle's windshield occurs. Example embodiments may be directed to creating a windshield or windshield casing which has compliance when a contact with the windshield occurs. As described herein, a windshield may be mounted to a vehicle in a unique way which allows for much of the energy of the impact of a colliding object with the windshield to be dissipated.

In one example embodiment, an apparatus may include a casing configured to attach to a frame of a vehicle and encase one or more edges of a windshield of the vehicle. The casing may include an energy-absorbing foam. The apparatus may also include a plurality of plugs configured to be inserted within the casing and the foam and into multiple slots in the edge(s) of the windshield. Each of the plurality of plugs may include respective openings, and the plurality of plugs may be configured to enable movement of the windshield within the casing based on compression of the foam by the plurality of plugs. Additionally, the apparatus may include a plurality of studs configured to be inserted through the casing, a respective slot of the multiple slots in the edge(s) of the windshield, and an opening of a respective plug that is within the respective slot.

If the windshield is deformed inward (i.e. toward the interior of the vehicle) due to contact with an object, the deformation may cause a displacement of the windshield. The displacement of the windshield may be guided by the slots built into the edge(s) of the windshield as the plurality of studs slide within the respective openings of the plurality of plugs and the plurality of plugs compress the foam. Advantageously, a portion of the impact energy resulting from the contact with the windshield may be dissipated as the foam within the casing is compressed. As such, the apparatus may alleviate the severity of the impact with the windshield.

In another example embodiment, an apparatus may include a foam configured to be positioned between the windshield and a frame of the vehicle. For instance, the foam may be positioned along one or more sides of an interior perimeter of the windshield. By way of example, the foam may be attached to the windshield using an adhesive. Furthermore, the foam may be attached to a body plate using an adhesive, and the body plate may be attached to a body gasket and the frame of the vehicle using a fastener. Additionally, the apparatus may include one or more rigid components that are configured to compress the foam when the windshield is deformed. For instance, the one or more rigid components may include a first rigid component that is attached to a first side of the windshield along the interior perimeter of the windshield and a second rigid component that is attached to a second side of the windshield along the interior perimeter of the windshield.

In some examples, the apparatus may further include a bladder configured to encase the foam. For instance, the bladder may be a thin, flexible, plastic-like material that is configured to seal the foam, in order to prevent deformation of the foam, for example. And the bladder may then be attached to the windshield and the body plate using an adhesive(s).

Many parameters of the described embodiments allow for variation in properties. For example, in the first embodiment, the slot size, plug size, foam density, and foam volume can all be varied in order to absorb the energy of the impact at different rates and to different extents. Similarly, the composition of the plug and/or stud may also be varied in order to absorb the energy of the impact at different rates and to different extents. Additionally, in the second embodiment, the size, position, and/or composition of any of the components of the apparatus may vary, as further described hereinafter. The embodiments can therefore be tuned to specific purposes and applications, depending on the needs of the particular vehicle in question and the particular application.

Additionally, the embodiments disclosed herein may be used on any type of vehicle, including conventional automobiles and automobiles having an autonomous mode of operation. However, the term "vehicle" is to be broadly construed to cover any moving object, including, for instance, a truck, a van, a semi-trailer truck, a motorcycle, a golf cart, an off-road vehicle, or a farm vehicle, as well as a carrier that rides on a track such as a rollercoaster, trolley, tram, or train car, among other examples.

Referring now to the Figures, FIG. 1 illustrates an example vehicle 100, in accordance with an embodiment. In particular, FIG. 1 shows a Right Side View, Front View, Back View, and Top View of the vehicle 100. Although vehicle 100 is illustrated in FIG. 1 as a car, as discussed above, other embodiments are possible. Furthermore, although the example vehicle 100 is shown as a vehicle that may be configured to operate in autonomous mode, the embodiments described herein are also applicable to vehicles that are not configured to operate autonomously. Thus, the example vehicle 100 is not meant to be limiting.

As shown, the vehicle 100 includes a first sensor unit 102, a second sensor unit 104, a third sensor unit 106, a wireless communication system 108, and a camera 110. Each of the first, second, and third sensor units 102-106 may include any combination of global positioning system sensors, inertial measurement units, radio detection and ranging (RADAR) units, laser rangefinders, light detection and ranging (LIDAR) units, cameras, and acoustic sensors. Other types of sensors are possible as well.

While the first, second, and third sensor units 102-106 are shown to be mounted in particular locations on the vehicle 100, in some embodiments the sensor units 102-106 may be mounted elsewhere on the vehicle 100, either inside or outside the vehicle 100. Further, while only three sensor units are shown, in some embodiments more or fewer sensor units may be included in the vehicle 100.

In some embodiments, one or more of the first, second, and third sensor units 102-106 may include one or more movable mounts on which the sensors may be movably mounted. The movable mount may include, for example, a rotating platform. Sensors mounted on the rotating platform could be rotated so that the sensors may obtain information from each direction around the vehicle 100. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some embodiments, one or more of the first, second, and third sensor units 102-106 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 108 may be any system configured to wirelessly couple to one or more other vehicles, sensors, or other entities, either directly or via a communication network. To this end, the wireless communication system 108 may include an antenna and a chipset for communicating with the other vehicles, sensors, or other entities either directly or via a communication network. The chipset or wireless communication system 108 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 108 may take other forms as well.

While the wireless communication system 108 is shown positioned on a roof of the vehicle 100, in other embodiments the wireless communication system 108 could be located, fully or in part, elsewhere.

The camera 110 may be any camera (e.g., a still camera, a video camera, etc.) configured to capture images of the environment in which the vehicle 100 is located. To this end, the camera 110 may be configured to detect visible light, or may be configured to detect light from other portions of the spectrum, such as infrared or ultraviolet light. Other types of cameras are possible as well. The camera 110 may be a two-dimensional detector, or may have a three-dimensional spatial range. In some embodiments, the camera 110 may be, for example, a range detector configured to generate a two-dimensional image indicating a distance from the camera 110 to a number of points in the environment. To this end, the camera 110 may use one or more range detecting techniques. For example, the camera 110 may use a structured light technique in which the vehicle 100 illuminates an object in the environment with a predetermined light pattern, such as a grid or checkerboard pattern and uses the camera 110 to detect a reflection of the predetermined light pattern off the object. Based on distortions in the reflected light pattern, the vehicle 100 may determine the distance to the points on the object. The predetermined light pattern may comprise infrared light, or light of another wavelength. As another example, the camera 110 may use a laser scanning technique in which the vehicle 100 emits a laser and scans across a number of points on an object in the environment. While scanning the object, the vehicle 100 uses the camera 110 to detect a reflection of the laser off the object for each point. Based on a length of time it takes the laser to reflect off the object at each point, the vehicle 100 may determine the distance to the points on the object. As yet another example, the camera 110 may use a time-of-flight technique in which the vehicle 100 emits a light pulse and uses the camera 110 to detect a reflection of the light pulse off an object at a number of points on the object. In particular, the camera 110 may include a number of pixels, and each pixel may detect the reflection of the light pulse from a point on the object. Based on a length of time it takes the light pulse to reflect off the object at each point, the vehicle 100 may determine the distance to the points on the object. The light pulse may be a laser pulse. Other range detecting techniques are possible as well, including stereo triangulation, sheet-of-light triangulation, interferometry, and coded aperture techniques, among others. The camera 110 may take other forms as well.

In some embodiments, the camera 110 may include a movable mount and/or an actuator, as described above, that are configured to adjust the position and/or orientation of the camera 110 by moving the camera 110 and/or the movable mount.

While the camera 110 is shown to be mounted inside a front windshield of the vehicle 100, in other embodiments the camera 110 may be mounted elsewhere on the vehicle 100, either inside or outside the vehicle 100.

The vehicle 100 may include one or more other components in addition to or instead of those shown.

Figure 2:
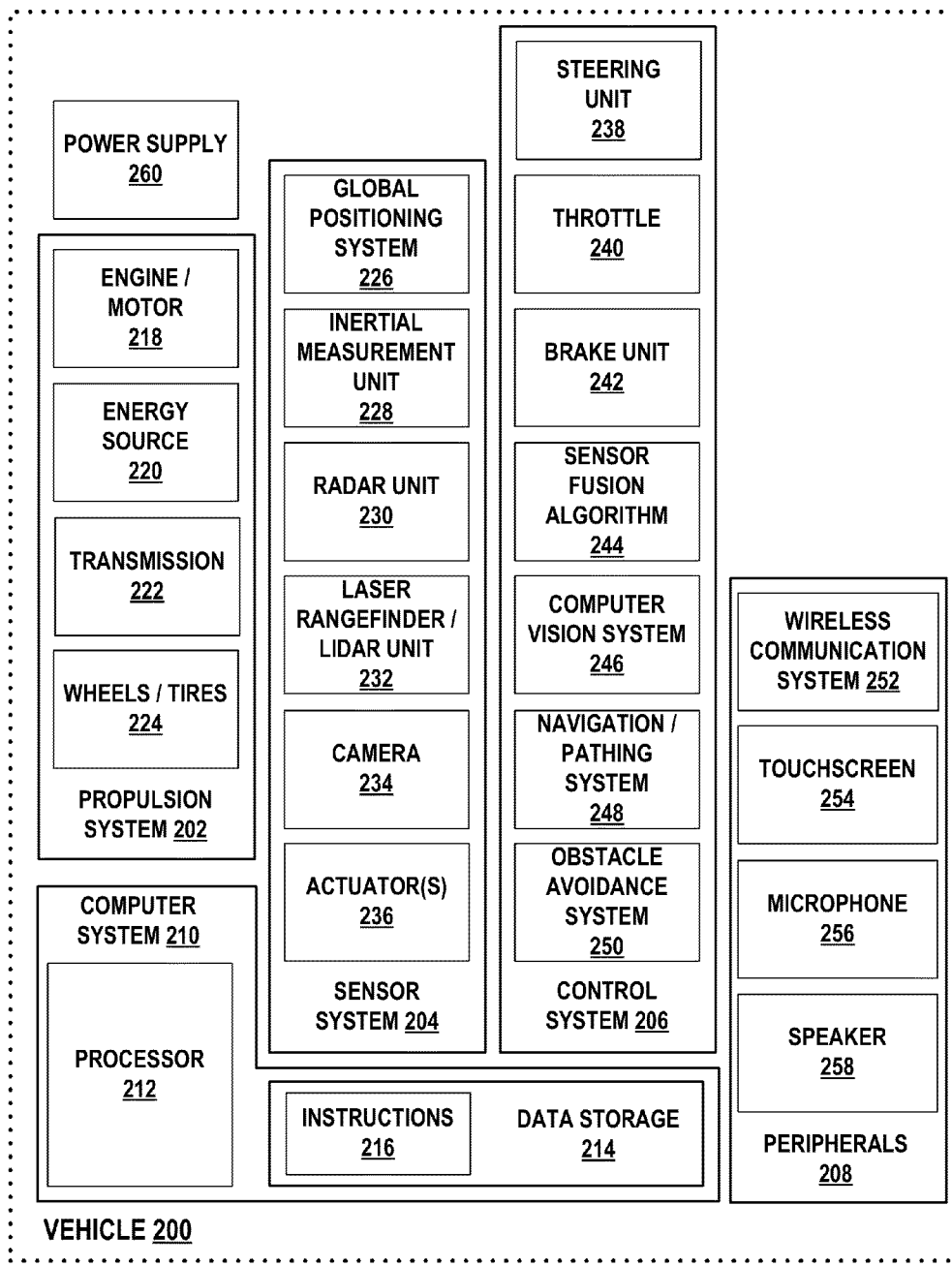
FIG. 2 is a simplified block diagram of an example vehicle, in accordance with an embodiment.

FIG. 2 is a simplified block diagram of an example vehicle 200, in accordance with an embodiment. The vehicle 200 may, for example, be similar to the vehicle 100 described above in connection with FIG. 1. The vehicle 200 may take other forms as well.

As shown, the vehicle 200 includes a propulsion system 202, a sensor system 204, a control system 206, peripherals 208, and a computer system 210 including a processor 212, data storage 214, and instructions 216. In other embodiments, the vehicle 200 may include more, fewer, or different systems, and each system may include more, fewer, or different components. Additionally, the systems and components shown may be combined or divided in any number of ways.

The propulsion system 202 may be configured to provide powered motion for the vehicle 200. As shown, the propulsion system 202 includes an engine/motor 218, an energy source 220, a transmission 222, and wheels/tires 224.

The engine/motor 218 may be or include any combination of an internal combustion engine, an electric motor, a steam engine, and a Stirling engine. Other motors and engines are possible as well. In some embodiments, the propulsion system 202 could include multiple types of engines and/or motors. For instance, a gas-electric hybrid car could include a gasoline engine and an electric motor. Other examples are possible.

The energy source 220 may be a source of energy that powers the engine/motor 218 in full or in part. That is, the engine/motor 218 may be configured to convert the energy source 220 into mechanical energy. Examples of energy sources 220 include gasoline, diesel, propane, other compressed gas-based fuels, ethanol, solar panels, batteries, and other sources of electrical power. The energy source(s) 220 could additionally or alternatively include any combination of fuel tanks, batteries, capacitors, and/or flywheels. In some embodiments, the energy source 220 may provide energy for other systems of the vehicle 200 as well.

The transmission 222 may be configured to transmit mechanical power from the engine/motor 218 to the wheels/tires 224. To this end, the transmission 222 may include a gearbox, clutch, differential, drive shafts, and/or other elements. In embodiments where the transmission 222 includes drive shafts, the drive shafts could include one or more axles that are configured to be coupled to the wheels/tires 224.

The wheels/tires 224 of vehicle 200 could be configured in various formats, including a unicycle, bicycle/motorcycle, tricycle, or car/truck four-wheel format. Other wheel/tire formats are possible as well, such as those including six or more wheels. In any case, the wheels/tires 224 of vehicle 224 may be configured to rotate differentially with respect to other wheels/tires 224. In some embodiments, the wheels/tires 224 may include at least one wheel that is fixedly attached to the transmission 222 and at least one tire coupled to a rim of the wheel that could make contact with the driving surface. The wheels/tires 224 may include any combination of metal and rubber, or combination of other materials.

The propulsion system 202 may additionally or alternatively include components other than those shown.

The sensor system 204 may include a number of sensors configured to sense information about an environment in which the vehicle 200 is located, as well as one or more actuators 236 configured to modify a position and/or orientation of the sensors. As shown, the sensors of the sensor system 204 include a Global Positioning System (GPS) 226, an inertial measurement unit (IMU) 228, a RADAR unit 230, a laser rangefinder and/or LIDAR unit 232, and a camera 234. The sensor system 204 may include additional sensors as well, including, for example, sensors that monitor internal systems of the vehicle 200 (e.g., an $O_2$ monitor, a fuel gauge, an engine oil temperature, etc.). Other sensors are possible as well.

The GPS 226 may be any sensor configured to estimate a geographic location of the vehicle 200. To this end, the GPS 226 may include a transceiver configured to estimate a position of the vehicle 200 with respect to the Earth. The GPS 226 may take other forms as well.

The IMU 228 may be any combination of sensors configured to sense position and orientation changes of the vehicle 200 based on inertial acceleration. In some embodiments, the combination of sensors may include, for example, accelerometers and gyroscopes. Other combinations of sensors are possible as well.

The RADAR 230 unit may be any sensor configured to sense objects in the environment in which the vehicle 200 is located using radio signals. In some embodiments, in addition to sensing the objects, the RADAR unit 230 may additionally be configured to sense the speed and/or heading of the objects.

Similarly, the laser rangefinder or LIDAR unit 232 may be any sensor configured to sense objects in the environment in which the vehicle 200 is located using lasers. In particular, the laser rangefinder or LIDAR unit 232 may include a laser source and/or laser scanner configured to emit a laser and a detector configured to detect reflections of the laser. The laser rangefinder or LIDAR 232 may be configured to operate in a coherent (e.g., using heterodyne detection) or an incoherent detection mode.

The camera 234 may be any camera (e.g., a still camera, a video camera, etc.) configured to capture images of the environment in which the vehicle 200 is located. To this end, the camera may take any of the forms described above.

The sensor system 204 may additionally or alternatively include components other than those shown.

The control system 206 may be configured to control operation of the vehicle 200 and its components. To this end, the control system 206 may include a steering unit 238, a throttle 240, a brake unit 242, a sensor fusion algorithm 244, a computer vision system 246, a navigation or pathing system 248, and an obstacle avoidance system 250.

The steering unit 238 may be any combination of mechanisms configured to adjust the heading of vehicle 200.

The throttle 240 may be any combination of mechanisms configured to control the operating speed of the engine/motor 218 and, in turn, the speed of the vehicle 200.

The brake unit 242 may be any combination of mechanisms configured to decelerate the vehicle 200. For example, the brake unit 242 may use friction to slow the wheels/tires 224. As another example, the brake unit 242 may convert the kinetic energy of the wheels/tires 224 to electric current. The brake unit 242 may take other forms as well.

The sensor fusion algorithm 244 may be an algorithm (or a computer program product storing an algorithm) configured to accept data from the sensor system 204 as an input. The data may include, for example, data representing information sensed at the sensors of the sensor system 204. The sensor fusion algorithm 244 may include, for example, a Kalman filter, a Bayesian network, or another algorithm. The sensor fusion algorithm 244 may further be configured to provide various assessments based on the data from the sensor system 204, including, for example, evaluations of individual objects and/or features in the environment in which the vehicle 200 is located, evaluations of particular situations, and/or evaluations of possible impacts based on particular situations. Other assessments are possible as well.

The computer vision system 246 may be any system configured to process and analyze images captured by the camera 234 in order to identify objects and/or features in the environment in which the vehicle 200 is located, including, for example, traffic signals and obstacles. To this end, the computer vision system 246 may use an object recognition algorithm, a Structure from Motion (SFM) algorithm, video tracking, or other computer vision techniques. In some embodiments, the computer vision system 246 may additionally be configured to map the environment, track objects, estimate the speed of objects, etc.

The navigation and pathing system 248 may be any system configured to determine a driving path for the vehicle 200. The navigation and pathing system 248 may additionally be configured to update the driving path dynamically while the vehicle 200 is in operation. In some embodiments, the navigation and pathing system 248 may be configured to incorporate data from the sensor fusion algorithm 244, the GPS 226, and one or more predetermined maps so as to determine the driving path for vehicle 200.

The obstacle avoidance system 250 may be any system configured to identify, evaluate, and avoid or otherwise negotiate obstacles in the environment in which the vehicle 200 is located.

The control system 206 may additionally or alternatively include components other than those shown.

Peripherals 208 may be configured to allow the vehicle 200 to interact with external sensors, other vehicles, and/or a user. To this end, the peripherals 208 may include, for example, a wireless communication system 252, a touchscreen 254, a microphone 256, and/or a speaker 258.

The wireless communication system 252 may take any of the forms described above.

The touchscreen 254 may be used by a user to input commands to the vehicle 200. To this end, the touchscreen 254 may be configured to sense at least one of a position and a movement of a user's finger via capacitive sensing, resistance sensing, or a surface acoustic wave process, among other possibilities. The touchscreen 254 may be capable of sensing finger movement in a direction parallel or planar to the touchscreen surface, in a direction normal to the touchscreen surface, or both, and may also be capable of sensing a level of pressure applied to the touchscreen surface. The touchscreen 254 may be formed of one or more translucent or transparent insulating layers and one or more translucent or transparent conducting layers. The touchscreen 254 may take other forms as well.

The microphone 256 may be configured to receive audio (e.g., a voice command or other audio input) from a user of the vehicle 200. Similarly, the speakers 258 may be configured to output audio to the user of the vehicle 200.

The peripherals 208 may additionally or alternatively include components other than those shown.

The computer system 210 may be configured to transmit data to and receive data from one or more of the propulsion system 202, the sensor system 204, the control system 206, and the peripherals 208. To this end, the computer system 210 may be communicatively linked to one or more of the propulsion system 202, the sensor system 204, the control system 206, and the peripherals 208 by a system bus, network, and/or other connection mechanism (not shown).

The computer system 210 may be further configured to interact with and control one or more components of the propulsion system 202, the sensor system 204, the control system 206, and/or the peripherals 208. For example, the computer system 210 may be configured to control operation of the transmission 222 to improve fuel efficiency. As another example, the computer system 210 may be configured to cause the camera 234 to capture images of the environment. As yet another example, the computer system 210 may be configured to store and execute instructions corresponding to the sensor fusion algorithm 244. As still another example, the computer system 210 may be configured to store and execute instructions for displaying a display on the touchscreen 254. Other examples are possible as well.

As shown, the computer system 210 includes the processor 212 and data storage 214. The processor 212 may comprise one or more general-purpose processors and/or one or more special-purpose processors. To the extent the processor 212 includes more than one processor, such processors could work separately or in combination. Data storage 214, in turn, may comprise one or more volatile and/or one or more nonvolatile storage components, such as optical, magnetic, and/or organic storage, and data storage 214 may be integrated in whole or in part with the processor 212.

In some embodiments, data storage 214 may contain instructions 216 (e.g., program logic) executable by the processor 212 to execute various vehicle functions. Data storage 214 may contain additional instructions as well, including instructions to transmit data to, receive data from, interact with, and/or control one or more of the propulsion system 202, the sensor system 204, the control system 206, and the peripherals 208.

The computer system 202 may additionally or alternatively include components other than those shown.

As shown, the vehicle 200 further includes a power supply 260, which may be configured to provide power to some or all of the components of the vehicle 200. To this end, the power supply 260 may include, for example, a rechargeable lithium-ion or lead-acid battery. In some embodiments, one or more banks of batteries could be configured to provide electrical power. Other power supply materials and configurations are possible as well. In some embodiments, the power supply 260 and energy source 220 may be implemented together, as in some all-electric cars.

In some embodiments, one or more of the propulsion system 202, the sensor system 204, the control system 206, and the peripherals 208 could be configured to work in an interconnected fashion with other components within and/or outside their respective systems.

Further, the vehicle 200 may include one or more elements in addition to or instead of those shown. For example, the vehicle 200 may include one or more additional interfaces and/or power supplies. Other additional components are possible as well. In such embodiments, data storage 214 may further include instructions executable by the processor 212 to control and/or communicate with the additional components.

Still further, while each of the components and systems are shown to be integrated in the vehicle 200, in some embodiments, one or more components or systems may be removably mounted on or otherwise connected (mechanically or electrically) to the vehicle 200 using wired or wireless connections.

The vehicle 200 may take other forms as well.

Figure 3:
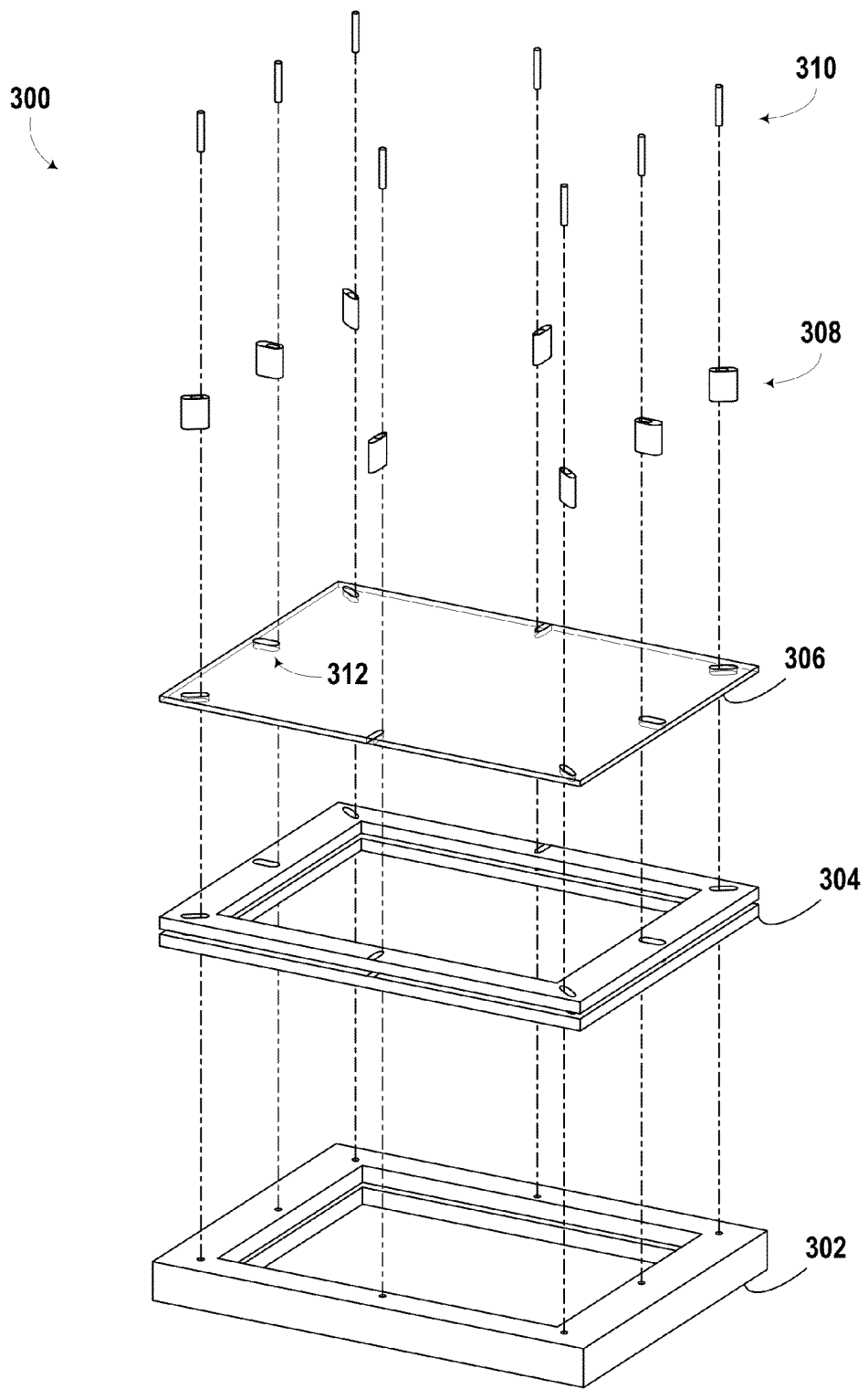
FIG. 3 illustrates an exploded view of an example apparatus, in accordance with an embodiment.

Turning now to FIG. 3, FIG. 3 illustrates an exploded view of an example apparatus 300. As shown in FIG. 3, the apparatus 300 includes a casing 302, a foam 304, a windshield 306, a plurality of plugs 308, and a plurality of studs 310.

The casing 302 may be configured to encase the windshield 306 and the foam 304. In one example, the casing 302 may be made of a metal, such as aluminum, steel, or another type of metal. Alternatively, the casing 302 may be made of a plastic or other type of material. Although the casing 302 is illustrated as having a rectangular shape, the example is not meant to be limiting. The shape of the casing 302 may vary depending on the shape of the windshield that the casing 302 is configured to encase. Similarly, the size of the casing 302 may vary depending on the size and thickness of the windshield.

In some examples, the casing 302 may include multiple separate casings (not shown). For instance, the casing 302 may be divided into four separate casings that are each configured to encase a respective edge (or portion of a respective edge) of a windshield. By way of example, the casing 302 may include a top casing, a bottom casing, a left casing, and a right casing that are each configured to encase a top edge, bottom edge, left edge, and right edge respectively.

The foam 304 may be an energy-absorbing foam. For example, the foam 304 may be a semi-rigid polyurethane foam. Other types of energy-absorbing foams such as Polystyrene foam, phenolic foam, or neoprene foam, may also be used. Additionally, the foam may be an open-cell foam or a closed-cell foam.

The windshield 306 may be made of any type of transparent material. For instance, the windshield 306 may be made of laminated safety glass, a type of treated glass which consists of two curved sheets of glass with a plastic layer laminated in between them for safety. Alternatively, the windshield may be made of a polycarbonate plastic, acrylic plastic, or other type of plastic. The type of material of the windshield 306 and the shape of the windshield 306 may vary depending on the particular vehicle that the apparatus 300 is configured for.

Additionally, the windshield 306 may include a plurality of slots 312. The slot size may vary depending on the thickness of the windshield. As one example, the slots 312 may be about one-half inch wide and about three to five inches long. However, the example is not meant to be limiting. Other sizes are also contemplated. For instance, the width and/or length of the slots 312 may be varied depending on the desired implementation. In one example, each of the slots 312 may be the same width and length. In other examples, one or more of the slots 312 may be a different size than the other slots. Therefore, the size of each of the slots 312 may be either the same or different. Additionally, each of the slots 312 may be located within a predetermined distance of an edge of the windshield 306, such that the slots 312 are encased by the casing 302. In one example, the center of each of the slots 312 may be within about five inches of the edge of the windshield.

The number of slots 312 may also vary. In one example, each edge of the windshield 306 may include at least two slots. In other examples, each edge of the windshield may include four to ten slots. The number of slots per edge may be the same, or the number of slots per edge may vary. In some examples, one or more edges of the windshield may not include any slots.

In some instances, the slots 312 may be uniformly distributed along each side of the windshield 306. For example, there may be an equal distance between each slot on a particular edge of the windshield 306. In other instances, the slots 312 may be non-uniformly distributed. In some examples, the slots 312 may have an elliptical shape. In other examples, the slots 312 may have a rectangular shape. Other slot shapes are also possible.

The plurality of plugs 308 may be configured to be inserted within the casing 302 and the foam 304, and into the slots 312 in the windshield 306. For example, each plug of the plurality of plugs 308 may be configured to be inserted into a respective slot of the plurality of slots 312. In one example, the plurality of plugs may be made of metallic material. In other examples, the plurality of plugs may be made of a plastic material.

Each of the plurality of plugs 308 may also include respective openings into which the plurality of studs 310 are configured to be inserted. For example, each of the plurality of studs 310 may be configured to be inserted through the casing 302, through a respective slot of the plurality of slots 312, and through an opening in a respective plug of the plurality of plugs 308. The plurality of studs may be made of a metal, plastic, or other type of material. The plurality of plugs may be configured to be inserted through pairs of holes in the casing 302, to secure the casing 302, the windshield 306, and the plurality of plugs 308 together.

Although FIG. 3 illustrates an embodiment in which a stud 310 is inserted through each of the plugs 308, the example is not meant to be limiting. In some examples, the number of studs 310 may be less than the number of plugs 308, such that studs are not inserted into all of the plugs 308. For instance, the example apparatus may be designed such that studs are not inserted through one or more of the plugs 308 in order to absorb the energy of the impact at different rates and to different extents.

Figure 4A:
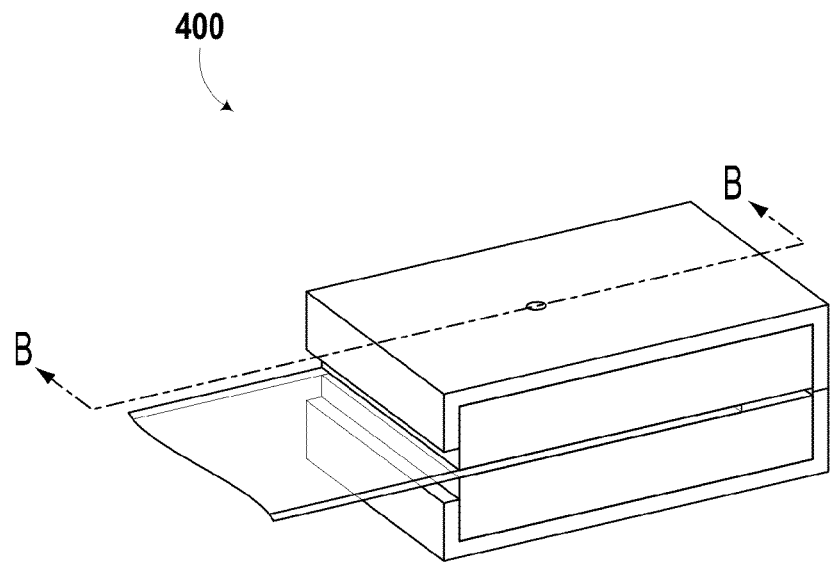
FIG. 4A illustrates a portion of the example apparatus of FIG. 3.

FIG. 4A illustrates a portion 400 of the example apparatus 300 of FIG. 3. The portion 400 includes a plug and a stud, which are more clearly shown in the cross-sectional view of FIG. 4B and the exploded view of FIG. 4C.

Figure 4B:
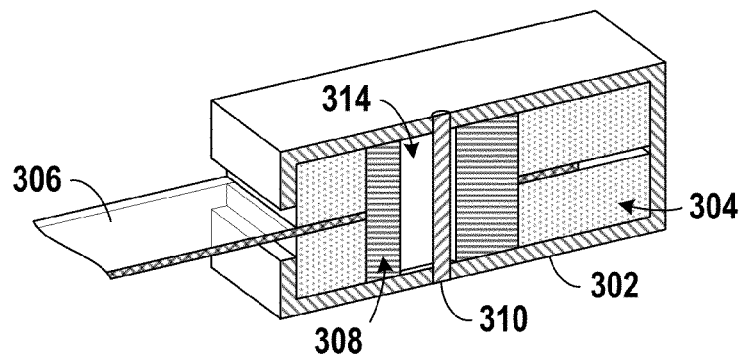
FIG. 4B illustrates a cross-sectional view of the portion of FIG. 4A, shown along line B of FIG. 4A.

FIG. 4B illustrates a cross-sectional view of the portion 400 of FIG. 4A, shown along line B of FIG. 4A. A portion of the casing 302, foam 304, and windshield 306, as well as a plug 308 and stud 310 are shown in FIG. 4B. The stud 310 is shown inserted through the casing 302 and an opening 314 in the plug 308.

Figure 4C:
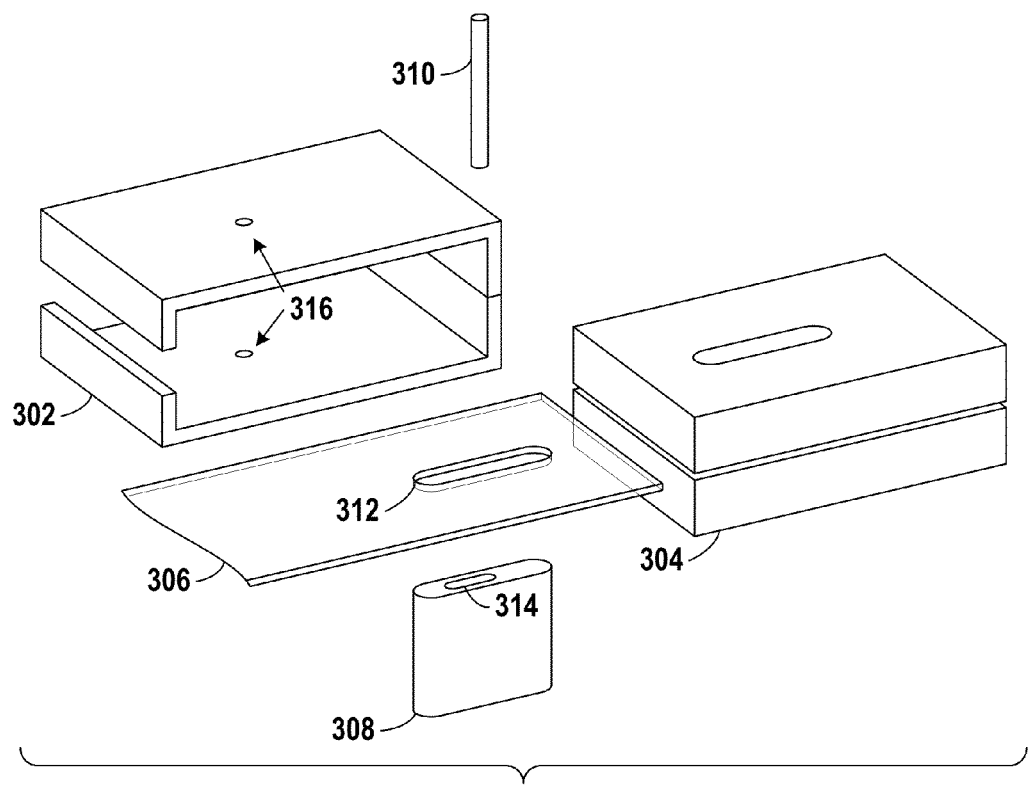
FIG. 4C illustrates a partial exploded view of the portion of FIG. 4A.

FIG. 4C illustrates a partial exploded view of the portion 400 of FIG. 4A. A slot 312 in the windshield 306, into which the plug 308 is inserted, is shown in FIG. 4C. Additionally, a pair of holes 316, into which the stud 310 is inserted, is shown.

As discussed above, in some instances, when an object contacts the windshield of a vehicle, the windshield may be deformed towards an interior of the vehicle. Such a deformation may pull the edges of the windshield towards a location of the impact with the windshield (e.g., the center of the windshield). As the edges of the windshield are pulled towards the location of the impact, the plurality of plugs of the windshield may be configured to move together with the windshield towards the location of the impact. As the plurality of plugs move within the casing towards the location of the impact, the plurality of plugs may compress the foam. Furthermore, as the plurality of plugs move towards the location of the impact, the plurality of studs may slide within the respective openings of the plurality of plugs. Therefore, the slots in the windshield, into which the plurality of plugs are inserted, may guide movement of the windshield within the casing when the windshield is deformed.

Figure 5:
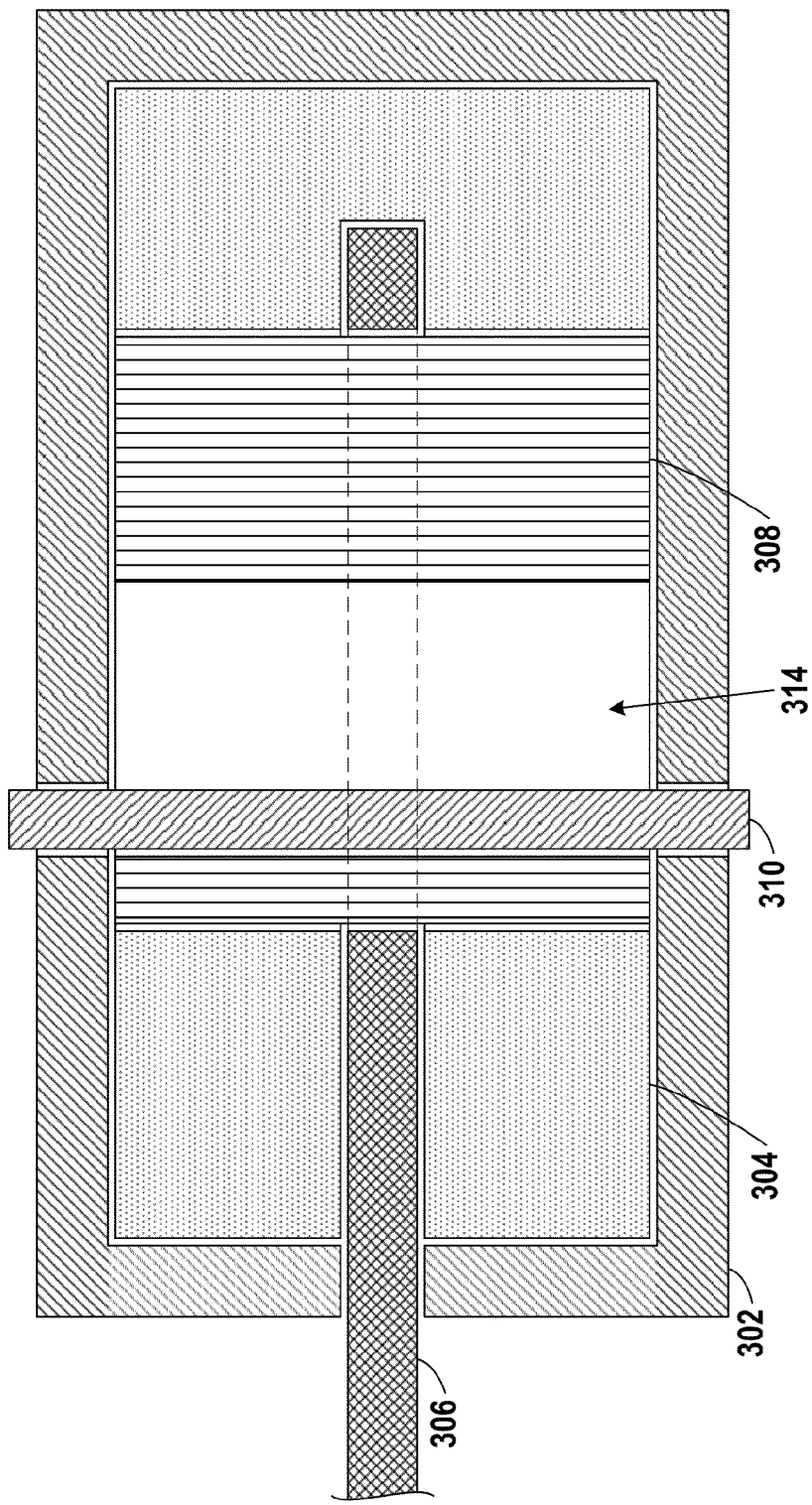
FIG. 5 illustrates a partial cross-sectional view of the example apparatus of FIG. 3.
Figure 6:
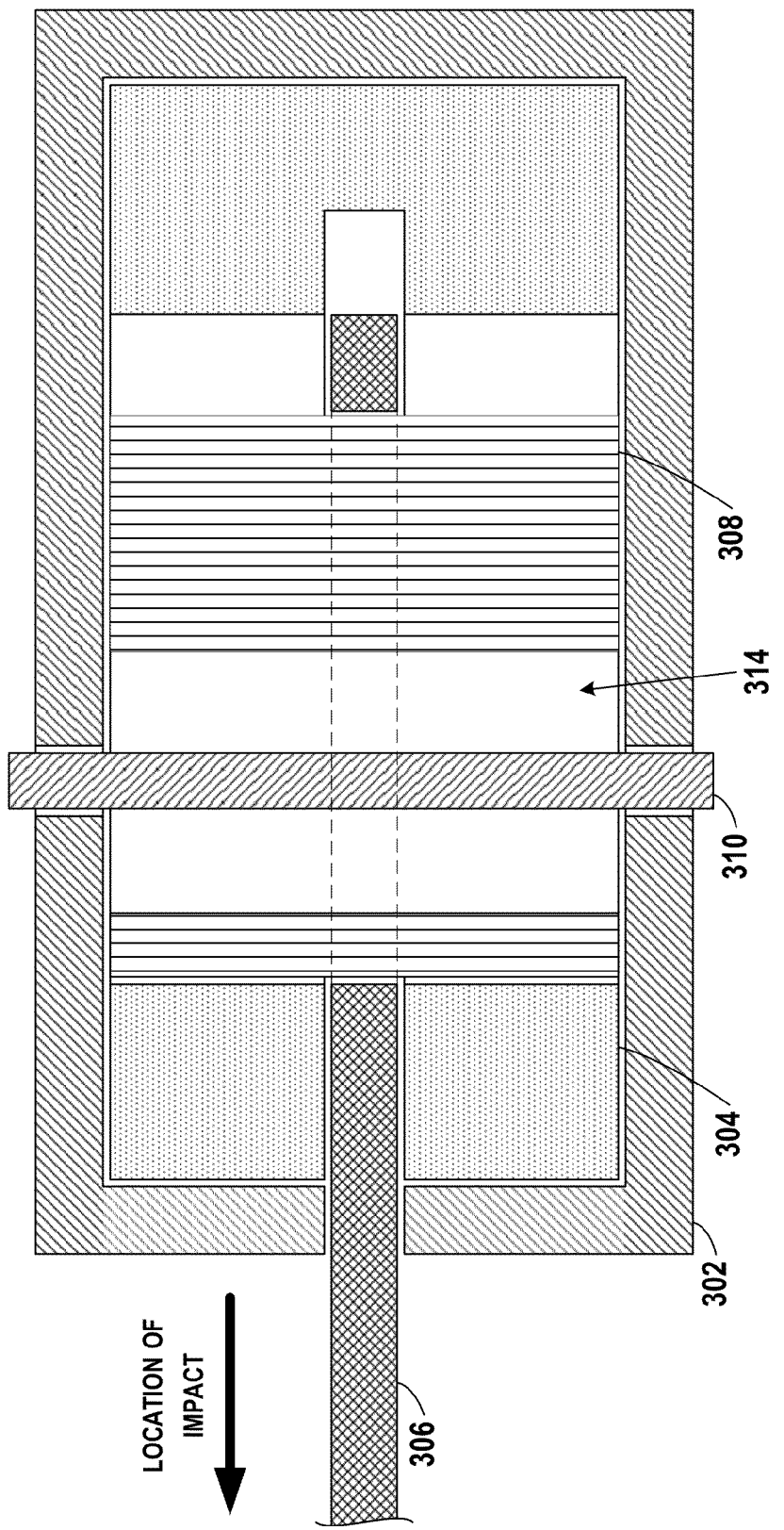
FIG. 6 illustrates another partial cross-sectional view of the example apparatus of FIG. 3.

An example of movement of a windshield within a casing is further illustrated with reference to FIGS. 5 and 6, which illustrate partial cross-sectional views of the example apparatus 300 of FIG. 3. FIGS. 5 and 6 show a partial view of the casing 302, foam 304, and windshield 306, as well as a plug 308 and stud 310. The plug 308 includes an opening 314, into which the stud 310 is inserted.

As shown in FIG. 5, prior to the windshield 306 being deformed due to contact with the windshield, the stud 310 may be located at a first position within the opening 314 in the plug 308. For example, the stud 310 may be located against a side of the opening 314 that is closest to a center of the windshield 306. Each of the plurality of studs of the example apparatus 300 shown in FIG. 3 may similarly be positioned within openings in the other plugs of the plurality of plugs.

FIG. 6 illustrates movement of the windshield 306 and plug 308 within the casing 302 as a result of a contact with the windshield 306. Specifically, when compared to FIG. 5, the windshield 306 and plug 308 have shifted to the left, towards a location of the impact with the windshield, for example. Note that the foam 304 has been compressed by the plug 308. Consequently, a portion of the impact energy stemming from the contact with the windshield 306 may be dissipated via the compression of the foam 304.

Additionally, the position of the stud 310 within the opening 314 has shifted as compared to the position of the stud 310 in FIG. 5. In other examples, the foam 304 may be compressed to a greater or lesser extent, depending on the amount of force associated with the contact with the windshield 306. Each additional slot in the windshield 306 may also guide movement of the windshield within the casing in a similar manner, such that each of the plurality of plugs functions to help mitigate a portion of the energy of the impact by compressing the foam.

Figure 7:
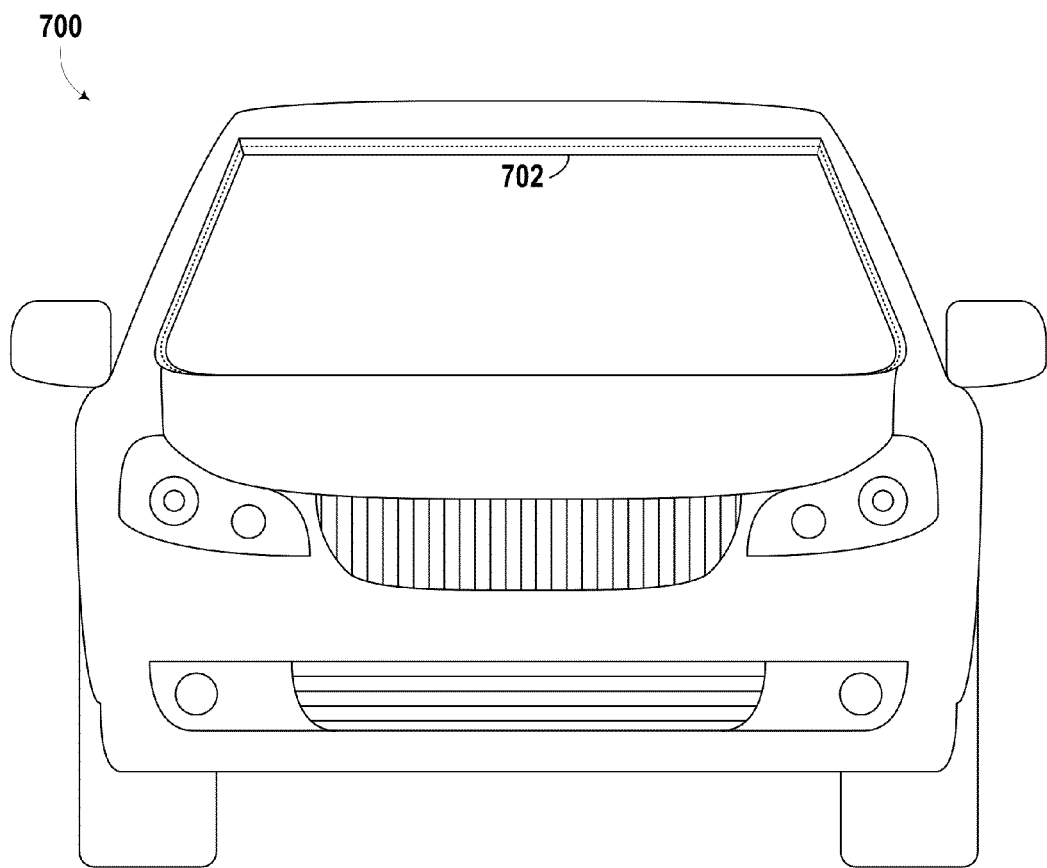
FIG. 7 illustrates a view of an example vehicle, in accordance with an embodiment.

FIG. 7 illustrates a view of an example vehicle 700. For purposes of illustration, the vehicle 700 is shown without having a windshield installed. When a windshield is installed, an apparatus 702 may encase a perimeter of the windshield. The apparatus 702 may be functionally similar to the example apparatus 300 described above with reference to FIGS. 3-6.

As shown in FIG. 7, the apparatus 702 may be integrated with the vehicle 700 such that the casing of the apparatus 702 is not visible when a windshield is installed. For instance, the apparatus 702 may be attached to a frame of the vehicle 700 and covered by one or more exterior body panels of the vehicle 700. By way of example, the apparatus 702 may be welded, bolted, epoxied, or otherwise rigidly affixed to the frame of the vehicle 700. In one instance, the frame of the vehicle 700 may also include holes or pairs of holes into which one or more of a plurality of studs, such as the plurality of studs 310 of FIG. 3, are inserted. Therefore, the plurality of studs may also function to secure the apparatus 702 to a frame of the vehicle 700.

Figure 8:
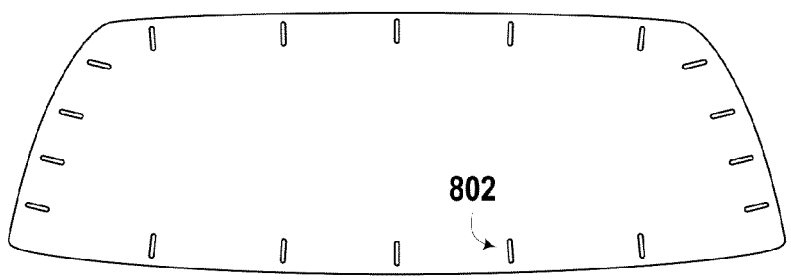
FIG. 8 illustrates an example configuration of a windshield.
Figure 9:
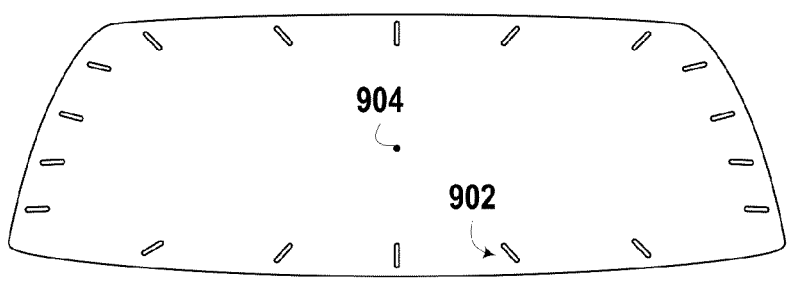
FIG. 9 illustrates another example configuration of a windshield.

FIGS. 8 and 9 illustrate two example configurations of a windshield that may be installed on the vehicle 700 using the apparatus 702. As shown in FIG. 8, according to an example configuration 800, each of a plurality of slots 802 may be substantially perpendicular to a nearest edge of the windshield. That is, a longest axis of each slot may be oriented approximately perpendicular to the nearest edge of the windshield.

As shown in FIG. 9, according to another example configuration 900, each of a plurality of slots 902 may be oriented towards a center 904 of the windshield. That is, a longest axis of each slot may be oriented approximately towards the center 904 of the windshield.

Other example configurations of slots in a windshield are also contemplated.

Figure 10:
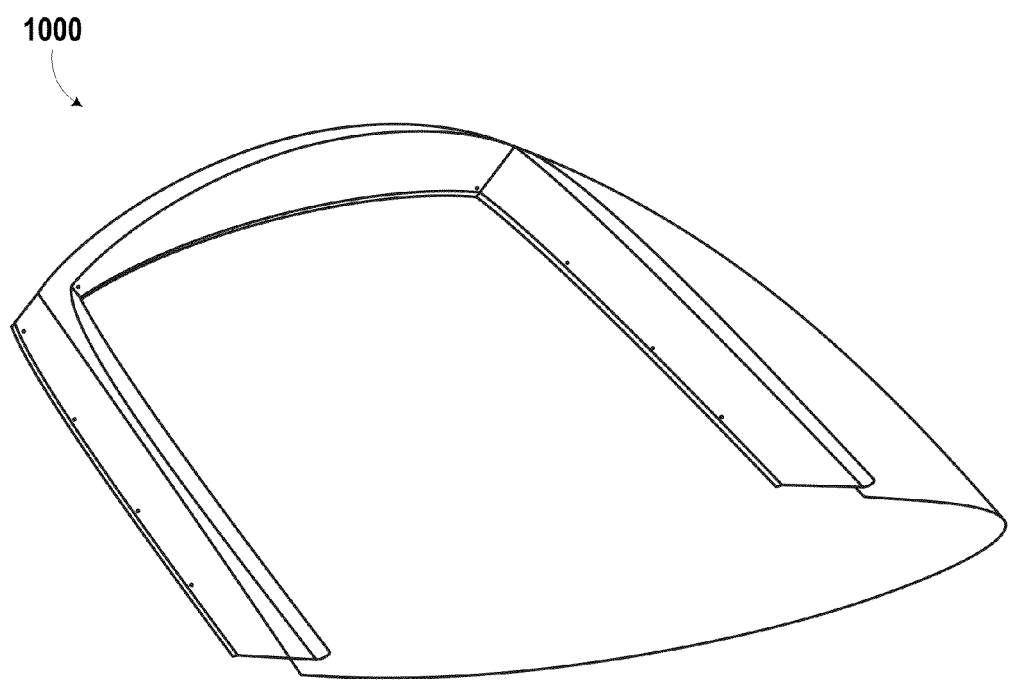
FIG. 10 illustrates another example apparatus.
Figure 11:
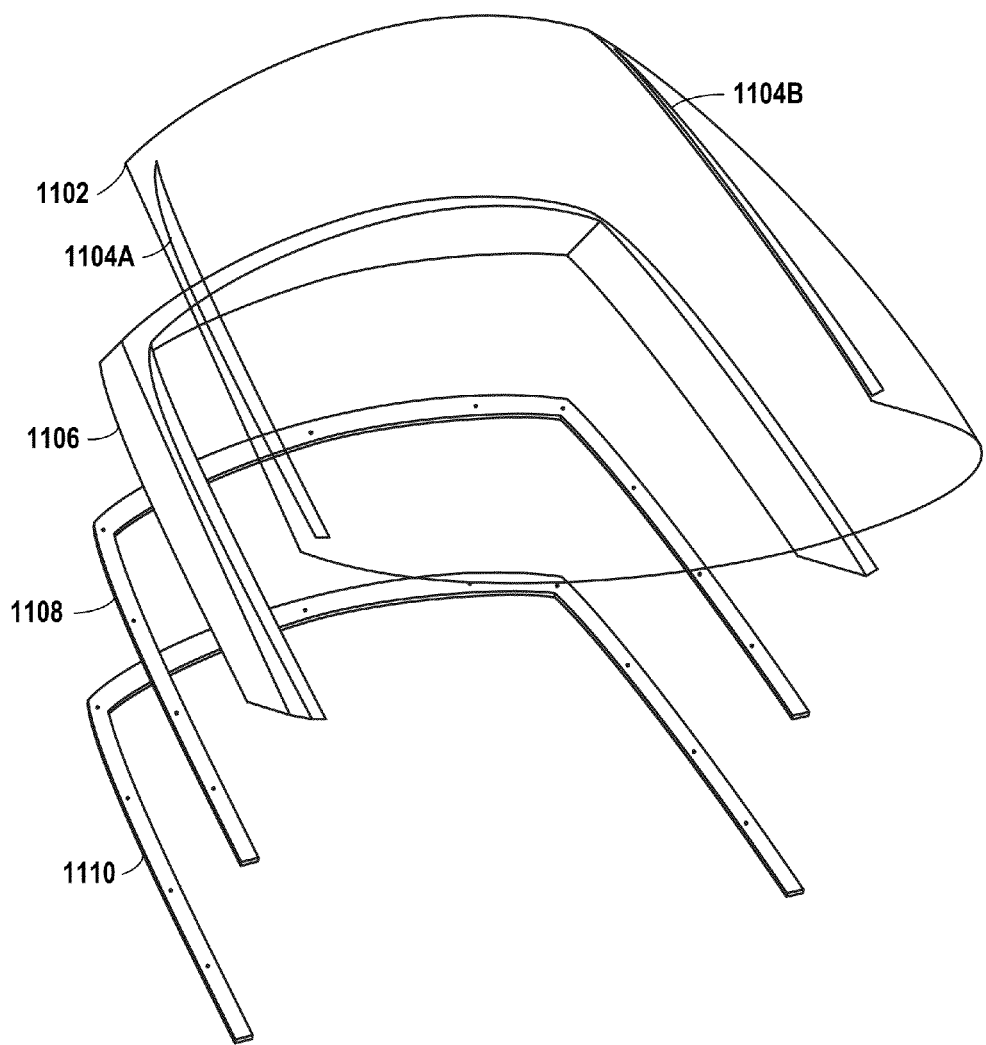
FIG. 11 illustrates an exploded view of the example apparatus of FIG. 10.

Turning now to FIGS. 10 and 11, an additional embodiment is described. FIG. 10 illustrates another example apparatus 1000. For ease of explanation, the apparatus 1000 is further described with reference to FIG. 11, which illustrates an exploded view of the example apparatus 1000 of FIG. 10.

The apparatus 1000 may be configured to mount a windshield 1102 to a vehicle. As shown in FIG. 11, the example apparatus includes rigid components 1104A and 1104B, a foam 1106, a body plate 1108, and a body gasket 1110.

The windshield 1102 may be made of any type of transparent material. For instance, the windshield 1102 may be made of laminated safety glass, a type of treated glass which consists of two curved sheets of glass with a plastic layer laminated in between them for safety. Alternatively, the windshield 1102 may be made of a polycarbonate plastic, acrylic plastic, or other type of plastic. The type of material of the windshield 1102 and the shape of the windshield 1102 may vary depending on the particular vehicle that the apparatus 1000 is configured for.

The rigid components 1104A, 1104B may be rigid pieces that are configured to transfer energy from the windshield into the foam. That is to say, the rigid components 1104A, 1104B may function to compress the foam when a force is applied to the windshield. In one instance, the rigid components 1104A, 1104B may be composed of a plastic or plastic-like material. In other instances, the rigid components 1104A, 1104B may be composed of a type of metal. The rigid components 1104A, 1104B may be bonded or attached to the windshield 1102 using any type of adhesive.

The foam 1106 may be any type of energy-absorbing foam. For example, the foam 1106 may be a semi-rigid polyurethane foam. Other types of energy-absorbing foams such as Polystyrene foam, phenolic foam, or neoprene foam, may also be used. Additionally, the foam 1106 may be an open-cell foam or a closed-cell foam. The foam 1106 may be attached to the windshield 1102 using any type of adhesive. Furthermore, when the foam 1106 is attached to the windshield 1102, the rigid components 1104A, 1104B may be positioned at least partially within the foam 1106.

In some instances, as further described with reference to FIG. 12 below, the foam 1106 may be encased by a flexible bladder (not shown). The flexible bladder may, for example, function to seal the foam and prevent deformation of the foam. Additionally, the flexible bladder may help attach the foam to the windshield, since an open-cell foam might wick a portion of the adhesive into the foam. Furthermore, the flexible bladder may help maintain the shape of the foam if internal fracturing of the foam occurs.

Although the foam 1106 is shown on three sides of the interior perimeter of the windshield 1106, in other examples, the foam may be positioned on more or less sides of the windshield. For example, foam may also be attached to the bottom of the windshield, or foam may be attached to the bottom of the windshield instead of the top of the windshield. In some examples, the density of the foam may vary, depending on the position which the foam is attached to the windshield. By way of example, the foam along the top side of the windshield may be more dense (i.e. softer) than the foam along the sides of the windshield.

In one example, the foam may be about three inches thick. However, other thicknesses of foam are also contemplated, and the example is not meant to be limiting. Furthermore, in some examples, the thickness of the foam may vary, depending on the position of the windshield that the foam is attached to, for example.

The body plate 1108 may be a thin plate that is attached to the foam using an adhesive. The body gasket 1110 may be made from a thin, flat material, such as paper, rubber, silicone, metal, or plastic, and may function to form a mechanical seal between the body plate 1108 and the frame of the vehicle. The body plate 1108 and the body gasket 1110 may then be attached to a frame of the vehicle using a fastener. For instance, the body plate 1108 and gasket 1110 may be bolted to the A-pillars and roof line of the vehicle, using holes in the body plate 1108 and gasket 1110.

Figure 12:
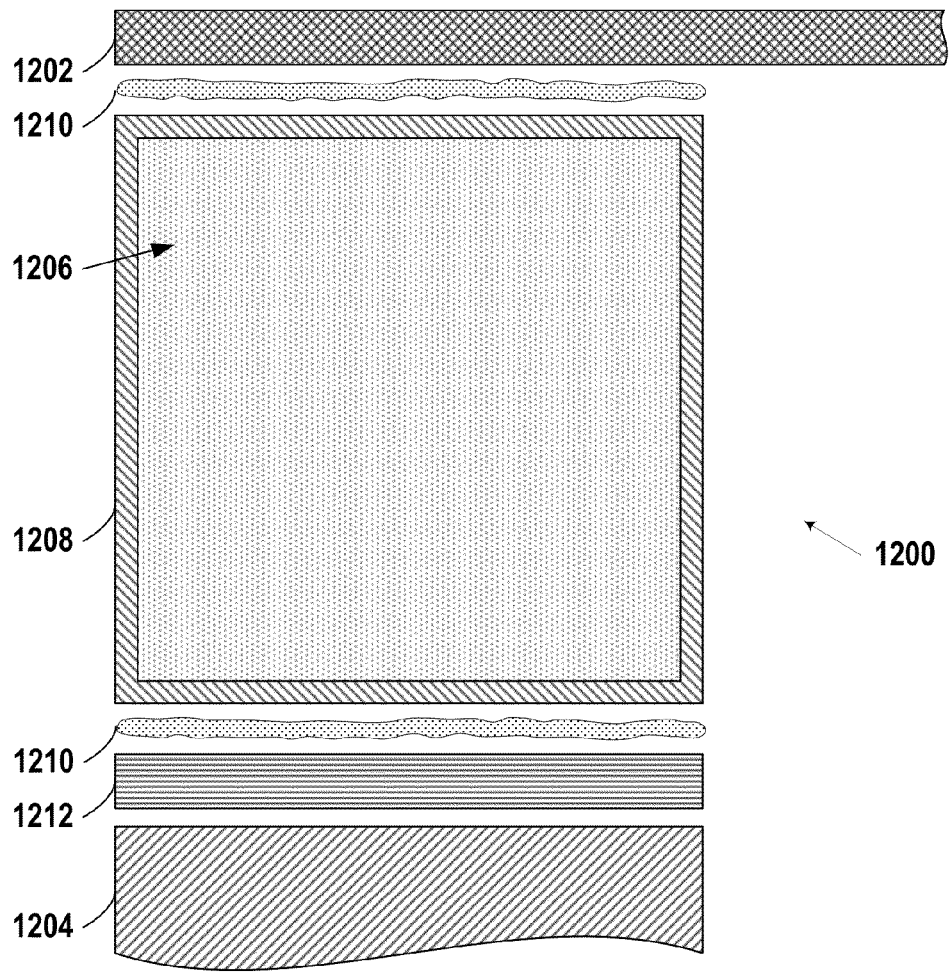
FIG. 12 illustrates a cross-sectional view of another example apparatus.

Turning now to FIG. 12, FIG. 12 illustrates a cross-sectional view of another example apparatus 1200. The example apparatus 1200 may be configured to mount a windshield 1202 to a frame 1204 of a vehicle. As shown in FIG. 12, the example apparatus 1200 includes an energy-absorbing material 1206, a bladder 1208, adhesive layers 1210, and an attachment component 1212.

The windshield 1202 may be any type of windshield. By way of example, the windshield may be similar to the windshield 1102 of FIG. 11. The frame 1204 of the vehicle may represent an A-pillar or a roof line of a vehicle, for example.

In one example, the energy-absorbing material 1206 may be a foam. For instance, the energy-absorbing material 1206 may include a foam similar to the foam 1106 of FIG. 11. In another example, the energy-absorbing material 1206 may include a plurality of foam granules. For instance, the energy-absorbing material 1206 may include a loose-fill packaging and cushioning material. As one example, the energy-absorbing material may include a plurality of polystyrene-based foam granules. The plurality of foam granules may be shaped to interlock when compressed and free flow when not compressed.

The bladder 1208 may be a flexible material configured to encase the energy-absorbing material 1206. For instance, the bladder may be a thin vinyl or plastic-like material configured to encase a foam or a plurality of foam granules. The bladder 1208 may be attached to the windshield 1202 and the attachment component 1212 using the adhesive layers 1210. In one example, the adhesive layers 1210 may each be the same type of adhesive. In other examples, the adhesive layers 1210 may be different types of adhesives.

The attachment component 1212 may provide a mechanical connection to the frame 1204 of the vehicle. By way of example, the attachment component may include a body plate and a body gasket similar to the body plate 1108 and body gasket 1110 of FIG. 11. However, the attachment component 1212 may take other foams as well.

Additionally, in some examples, the apparatus 1200 may further include one or more rigid components configured to compress the energy-absorbing material 1206 when the windshield 1202 is deformed (not shown). For instance, the apparatus 1200 may include a rigid component similar to the rigid component 1104A of FIG. 11.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunctions with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A vehicle comprising:
   a frame;
   a windshield; and
   an apparatus configured to mount the windshield to the frame, wherein the apparatus comprises:
   a foam configured to be positioned between the windshield and the frame along at least a portion of an interior perimeter of the windshield,
   one or more rigid components configured to compress the foam when the windshield is deformed, wherein the one or more rigid components are positioned at least partially within the foam.

2. The vehicle of claim 1, wherein the windshield comprises a polycarbonate windshield.

3. The vehicle of claim 1, wherein the apparatus further comprises a body plate configured to attach the foam to the frame.

4. The vehicle of claim 3, wherein the apparatus further comprises a gasket configured to be positioned between the body plate and the frame.

5. The vehicle of claim 1, wherein the apparatus further comprises a flexible bladder configured to encase the foam.

6. The vehicle of claim 1, wherein the one or more rigid components comprise a first rigid component configured to attach to a first side of the interior perimeter of the windshield and a second rigid component configured to attach to a second side of the interior perimeter of the windshield.

7. The vehicle of claim 1, wherein the foam is configured to be positioned along at least three sides of the interior perimeter of the windshield.

8. The vehicle of claim 1, wherein the apparatus further comprises a casing configured to attach to the frame, wherein the casing is configured to encase the foam and at least one edge of the windshield.

9. The vehicle of claim 8, wherein the one or more rigid components comprise a plurality of plugs configured to be inserted within the casing and the foam and into multiple slots in the at least one edge of the windshield, wherein the plurality of plugs are configured to enable movement of the windshield within the casing based on compression of the foam by the plurality of plugs.

10. The vehicle of claim 9, wherein the plurality of plugs include respective openings, and wherein the apparatus further comprises a plurality of studs configured to be inserted through the casing, through a respective slot of the multiple slots in the at least one edge of the windshield, and through an opening of a respective plug of the plurality of plugs that is within the respective slot.

11. The vehicle of claim 10, wherein the plurality of studs are configured to slide within the respective openings of the plurality of plugs based on compression of the foam by the plurality of plugs.

12. The vehicle of claim 9, wherein the multiple slots are configured to guide movement of the windshield within the casing when the windshield is deformed.

13. The vehicle of claim 12, wherein the movement of the windshield within the casing when the windshield is deformed is restricted based on movement of the plurality of studs within the respective openings of the plurality of plugs.

14. An apparatus configured to mount a windshield to a vehicle, the apparatus comprising:
   a foam configured to be positioned between the windshield and a frame of the vehicle along a portion of at least three sides of an interior perimeter of the windshield,
   one or more rigid components configured to compress the foam when the windshield is deformed, wherein the one or more rigid components are positioned at least partially within the foam, and
   an attachment component configured to attach the foam to the frame of the vehicle.

15. The apparatus of claim 14, wherein the attachment component comprises a body plate configured to attach the foam to the frame of the vehicle.

16. The apparatus of claim 14, wherein the attachment component comprises a flexible bladder configured to encase the foam.

17. The apparatus of claim 14, wherein the attachment component comprises a casing configured to attach to the frame, wherein the casing is configured to encase the foam and at least one edge of the windshield.

18. An apparatus configured to mount a windshield to a vehicle, the apparatus comprising:
   a flexible bladder configured to encase an energy-absorbing material, wherein the flexible bladder is configured to be positioned between the windshield and a frame of the vehicle along a portion of an interior perimeter of the windshield;
   one or more rigid components configured to attach to the interior perimeter of the windshield and compress the flexible bladder when the windshield is deformed, and
   a body plate configured to attach the flexible bladder to the frame of the vehicle.

19. The apparatus of claim 18, wherein the energy-absorbing material comprises a foam.

20. The apparatus of claim 18, wherein the energy-absorbing material comprises a plurality of foam granules.

* * * * *